June 1, 1926.

N. J. PEPIN

CLUTCH DEVICE

Filed Feb. 14, 1925

INVENTOR.
Nelson J. Pepin,
BY
Geo. P. Kimmel. ATTORNEY.

June 1, 1926.  
N. J. PEPIN  
CLUTCH DEVICE  
Filed Feb. 14, 1925

Nelson J. Pepin, INVENTOR.

BY

Geo. P. Kimmel, ATTORNEY.

Patented June 1, 1926.

1,587,410

UNITED STATES PATENT OFFICE.

NELSON J. PEPIN, OF LOWELL, MASSACHUSETTS.

CLUTCH DEVICE.

Application filed February 14, 1925. Serial No. 9,213.

This invention relates to clutch devices for use in connection with power pulleys or the like.

The primary object of this invention is the provision, in the manner as hereinafter set forth, of a clutch device designed to be brought into play through centrifugal action to transmit power from a power source to a power shaft or machine only after the said power machine from which the power is derived has attained sufficient speed to properly carry the load when connection between the power shaft and the power pulley is made by the clutch.

Another object of this invention is the provision, in a manner as hereinafter set forth, of a clutching device designed to be brought into play by centrifugal action and having means, in the manner as hereinafter set forth, for bringing the friction surface of the clutch shoes in contact, simultaneously throughout their length, with the face of the drum against which they are adapted to bear and to which they transmit motion from the power source.

A still further object of the invention is the provision, in a manner as hereinafter set forth, of a clutching device of the character above set forth, having means for automatically assisting in disengagement of the clutch shoes from the drum after the effects of centrifugal action or power have been removed from the parts of the clutch affected thereby.

A further and final object of the invention is the provision, in the manner as hereinafter set forth, of a centrifugally actuated clutch mechanism for use in connection with power transmitting devices, which will be positive and reliable in action, strong and durable, of few and simple parts, easily and quickly disassembled, smooth and quiet in operation, and inexpensive to manufacture and set up.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings.

In referring to the drawings in detail, like numerals of reference indicate corresponding parts throughout the several views.

Figure 1:
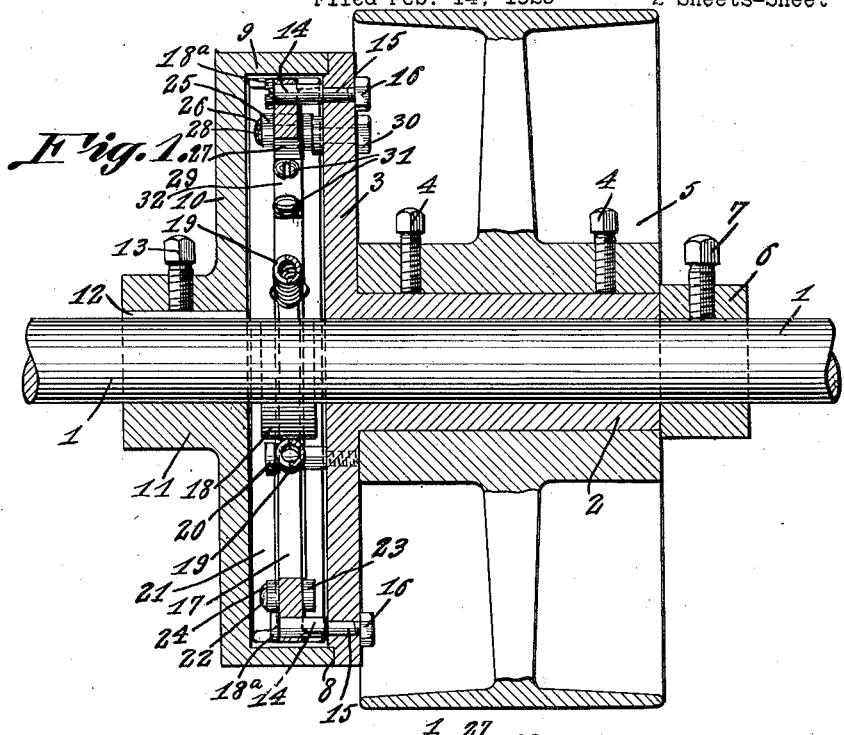
Figure 1 is a central longitudinal section taken through a clutch of the character embodying this invention showing the same connected to a power pulley. This section is taken upon the line 1—1 of Figure 2.

It is often desirable, in transmitting power from the source to the work point, that the engine or power plant be allowed to gain its maximum or a good speed before the load is placed thereon, thus starting up all of the machinery at a good initial speed rather than to place the load on the engine when the same is first started, this causing all of the machinery to start slowly and gradually working up to the desired speed. This latter process is straining upon the engine and further delays work in that considerably more time is consumed in starting all of the machinery connected to the source of power than would be the case if the engine were allowed to gain its maximum speed before the load is placed thereon. It would of course be impossible to throw the load onto the power plant quickly, and for that reason the present about to be described clutch mechanism has been designed, the object of which is to connect the power shaft in with a drive or power pulley connected to the source of power when the same has reached the proper speed. This action is automatic being brought about by centrifugal action.

In the drawings, there is indicated by the numeral 1 a power shaft through which power is transmitted, and mounted freely upon this shaft is a sleeve 2 upon one end of which is formed integral therewith a circular plate 3. Secured upon the sleeve 2 by means of the set screws 4 is a power pulley 5, which receives power from any desired source, through any desired connection, such as a pulley belt, etc. Upon one side of the pulley 5 there is secured about the shaft 1 a collar 6 retained in position by set screws 7. As will be seen the pulley 5, the sleeve 2, and plate 3, are all adapted to revolve freely upon the shaft 1, there being no connection between the sleeve 2 and the shaft 1.

The plate 3 has an annular peripheral recess 8 thereabout in which is adapted to be fitted to freely revolve therein, the free edge of the drum 9, which drum is carried upon the annular plate 10, and this plate is provided with the concentrically positioned collar 11 which surrounds the shaft 1 and is keyed thereto by means of the key 12. A set screw 13 is further provided to retain the key 12 in position.

Secured upon the face of the plate 3 within the drum 9 is the mechanism embodying the essentials of this invention, and this mechanism is constructed as follows.

Figure 2:
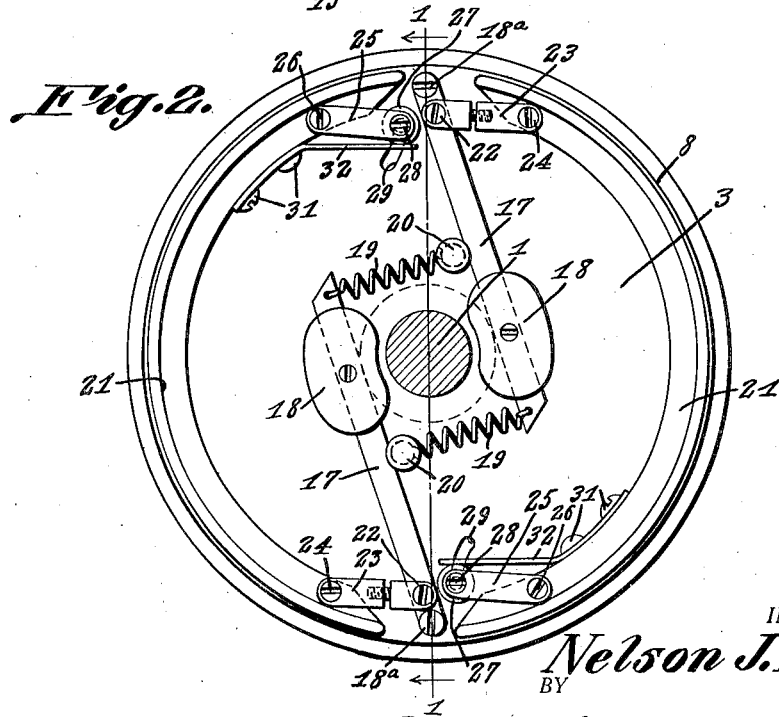
Figure 2 is a view showing the face of the clutch, with the drum thereof removed.

Projecting from the face of the plate 3 at diametrically opposite points is a pair of pins 14, each having a reduced portion 15 which extends through the plate and is secured in position by means of the nut 16 and bears against the outer face of the plate. These pins are each adjacent the periphery of the plate, as shown in Figure 2, and each carries thereon an inwardly extending swinging arm 17, each arm being pivotally mounted upon the pin 14 at the extreme end and secured in position thereon by means of the screw 18ª. These arms extend inwardly across the shaft 1 as shown, and are normally substantially parallel, and in opposed position, with the shaft 1 interposed therebetween. Each arm has secured thereto adjacent its inner end a weight member 18 and each arm further has secured to its extreme inner end a spring 19, which extends at substantially right angles to the arm to which it is attached and is secured at its other end to a stationary pin 20 which is secured in the face of the plate 3, and is further located adjacent the opposite arm 17. These pins 20 besides acting as connecting posts for the spring members 19 carried by the arms 17, serve as stops for the respective arms as shown.

There is provided a pair of substantially semicircular clutch or friction shoes 21, the curvature of these shoes being the same as that of the plate and the interior surface of the drum 9, and these shoes are positioned in end opposed relation against the face of the plate 3, as shown in Figure 2, there being a space between the opposed ends of the shoes and in these spaces one of the pivot posts 14 is positioned. Pivotally connected to each of the arms 17 adjacent the pivoted end thereof, by means of the pivot pin 22, is a turn-buckle device 23, the opposite end of which is pivotally connected by means of the screw 24 to the adjacent end of one of the friction or clutch shoes 21.

Each of the friction shoes has secured to its other end, that is the other end from that carrying the swivel or turn-buckle member 23, a link member 25 pivotally connected to the shoe, as at 26, and extending inwardly toward an arm 17 connected to the opposite shoe and further carrying upon its inner end a roller 27. The roller of each link 25 is pivotally secured to the inner end thereof by means of the pin 28, the inner end of the pin being extended through a slot 29 formed in the plate 3 and secured upon the outer face of the plate by means of the nut 30. It will be noted that the slot 29 arcs or curves in a direction substantially opposite to the curvature of the shoe 21. The object for this will become apparent as the description proceeds.

Each of the shoes 21 has secured to its inner or concave face, by means of screws or rivets 31, a spring tongue 32, the free end of which bears against the roller 27.

From the foregoing description it will be seen that when the power pulley 5 is revolved, it will cause the sleeve 2 and plate 3 to revolve, and when sufficient speed has been reached, the centrifugal force will cause the weight members 18 to swing outwardly away from the shaft 1 against the tension of the springs 19, and in so moving, the arms 17, pivoted at their outer ends, will move outwardly forcing the turn-buckles 23 against the shoes 21 and thus expanding or moving the shoes 21 away from each other to contact with the inner face of the drum 9. When this movement takes place there will be a slight circumferential movement as well as a radial movement, and when this circumferential movement takes place, the links swinging upon the pins 28, which support the inner ends of the links 25 and extend through and are secured in the slots 29, thus placing the spring tongues 32 under a slight strain, as the shoes move outwardly. This movement of the shoes 21, at the end carrying the links 25, allows the entire friction surface of the shoes to contact at once with the inner face of the drum and this slight play further prevents damage being done to the shoe in the event that the speed is so great as to force the weights outwardly with an undue amount of force. When the speed is reduced and the weight members gravitate back towards the center, the spring tongues 32 resting upon the rollers 27 will bear thereon thus pulling inwardly upon the shoes 21 and causing quick and complete disengagement of the shoes from the surface of the drum.

The pin 28 can be adjustably secured at any point in the slot 29 to locate the shoe away from or close to the drum as desired, this adjustment increasing or decreasing the speed with which the shoes engage the drum, and also increasing and decreasing the amount of power transmitted at any speed.

Figure 3:
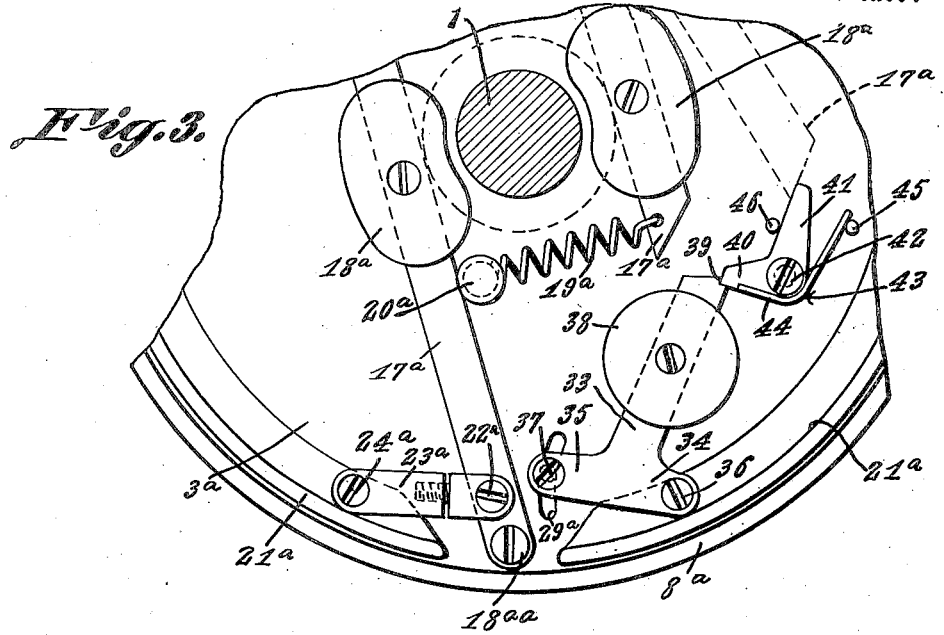
Figure 3 shows a slight modification in the construction of the connecting means between the clutch shoe and the body of the clutch.
Figure 4:
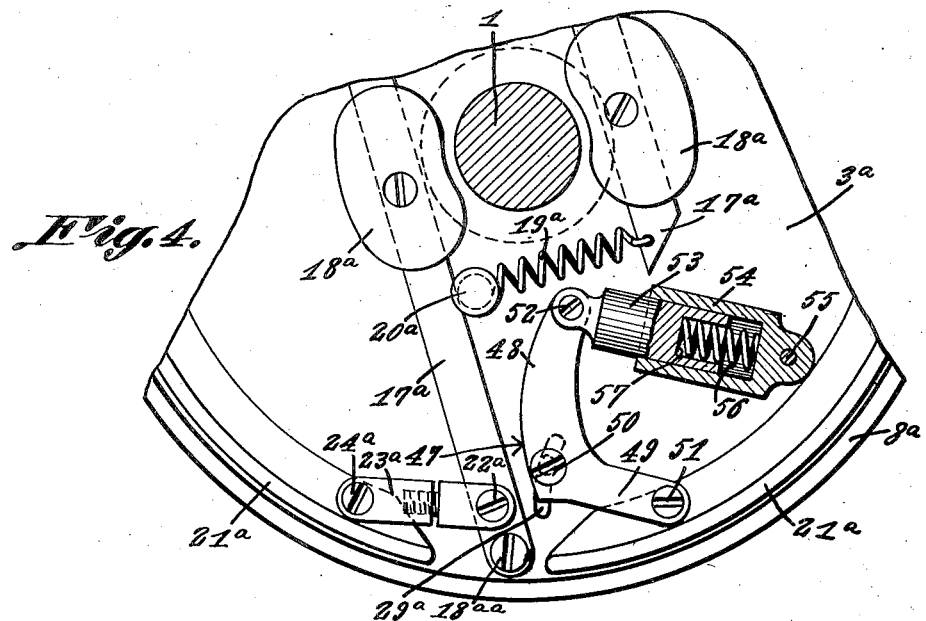
Figure 4 shows still another modification in the structure of the connecting means between the clutch shoe and the body of the clutch.

In Figures 3 and 4, there are shown slight modifications of the shoe actuating mechanism, indicated by the numerals 25, 27, 28 and 32, in Figure 2, and in Figure 3, this mechanism comprises an inverted substantially T-shaped member, comprising a long arm 33 and laterally extending short arms 34 and 35, respectively, at the lower end thereof. The short arm 34 is pivotally connected by means of the screw 36 to the shoe 21$^a$, and the arm 35 carries at its outer end the pin 37, which extends through the arcuate slot 29$^a$, as shown and is secured therein.

The long arm 33 carries thereon, at a point intermediate its ends, a weight member 38, and this arm has formed in its outer end a notch 39. Pivotally secured to the plate 3$^a$, slightly beyond the end of the arm 33 and between the same and the adjacent shoe 21$^a$, is a substantially right angled latch member, having a short arm 40 and a relatively long arm 41, and pivoted at the point of joinder by means of the pin 42. A flat spring 43 is connected with the under side of the arm 40, as at 44, and has its other end directed at right angles thereto and extended upwardly and held under tension against the pin 45 between the same and the arm 41. A stop pin 46 is provided to contact with the inner face of the arm 41 to prevent the spring 43 from throwing the same too far inward. The point of the short arm 40 is normally engaged in the notch 39 of the arm 33 of the automatic mechanism, as shown. This mechanism just described operates as follows. As the speed of the pulley 2 and plate 3$^a$ increases the arm 17$^a$ will naturally swing outwardly and through the upper ends of the shoes 21$^a$ may be forced outwardly toward the drum they will not grip the same because of the fact that the end of the weighted arm 33, held by the member 40, is prevented from moving down toward the drum to allow the shoe to move to engage the same. When, however, the arms 17$^a$ are forced by centrifugal action out to the point where they engage, and move the end of, the member 41, the member 40 is disengaged from the arm 33 allowing the same to swing out toward the drum for the shoe 21$^a$ to engage. The weight 38 assists in this outward movement of the arm 33. By this device the shoe is prevented from pressing against the drum until the load has been started by the slipping contact of one end of the shoe on the drum. When the power machine has acquired the proper speed and the load some momentum then the trip device operates to allow the shoes 21$^a$ to completely and properly engage the drum.

In Figure 4, the mechanism shown also acts to prevent a too quick engagement between the shoes and the drum. This mechanism comprises a substantially right angled or bell crank member, having a relatively long curved arm 48 and a short straight arm 49. A pivot pin 50 is passed through this crank at the point of joinder between the two arms, through and secured in the slot 29$^a$. The short arm 49 extends over, and is pivotally secured as at 51, to the adjacent clutch shoe 21$^a$, and the long arm is pivotally connected at its free end, as at 52, to the head of a plunger member 53, which is adapted to freely reciprocate in a dash pot 54. This dash pot 54 is pivotally connected as at 55 to the plate 3$^a$ and there is interposed between the bottom of the dash pot 54 and the inner end of the plunger 53 an expansion spring 56, the upper end of which spring seats in a socket 57 in the plunger to retain the same in the proper alignment with the axis of the dash pot.

In operation, as the arms 17$^a$ swing outwardly through centrifugal force the shoes 21$^a$ are prevented from too quickly engaging the drum, as the pivoted bell crank is prevented from swinging quickly due to the fact that one arm, arm 48, is retarded in its movement by the spring pressed dash pot piston 53.

Although the mechanism has been shown and described in connection with a power pulley and transmitting shaft it is to be understood that it is not limited to such use or application, but may be used in connection with any drive where the plate 3 can be mounted on the power side of the drive.

Also it is to be understood that applicant does not wish to be restricted to the application of the springs 19 and 19$^a$ to the points shown but they may be applied in any position where they are of advantage to the operation of the mechanism.

From the foregoing description it will be readily seen that there has been constructed an improved clutch mechanism which will be positive and certain in its operation to produce the desired results.

Having thus described my invention what I claim is:

1. A clutch mechanism of the character and for the purpose set forth, comprising an annular plate adapted to be mounted to freely revolve, a drum bearing against the face of said plate and adapted to be keyed to a power transmitting shaft, friction elements within said drum and mounted upon said plate, centrifugally actuated means mounted upon said plate and controlling said elements to cause the same to move to engaging position with the said drum, and means whereby said friction elements will be caused to move both circumferentially and radially to cause the entire friction surface of the elements to contact with the drum simultaneously.

2. A clutch mechanism of the character and for the purpose set forth, comprising an annular plate adapted to be mounted to freely revolve, a drum bearing against said plate and adapted to revolve with a shaft, means for revolving said plate, a pair of weighted arms pivoted at their outer ends at diametrically opposite points upon said plate, a pair of friction shoes within the drum, a link connection between each arm and the adjacent shoe whereby said shoes will be caused to move outwardly to engage the drum when the weighted arms are acted upon by centrifugal force, and means engaging each shoe whereby it is caused to move both radially and circumferentially when acted upon by said arms.

3. A clutch mechanism of the character and for the purpose set forth, comprising an annular plate adapted to freely revolve, a drum bearing against said plate and adapted to revolve with a shaft, means for revolving said plate, a pair of weighted arms pivoted at their outer ends at diametrically opposite points to said plate adjacent the periphery thereof and extending inwardly across the face thereof, one on each side of said shaft, means for normally maintaining the inner ends of the arms in close proximity to said shaft, a pair of arcuate friction shoe members, a link connection between one end of each shoe and an adjacent arm, and a connecting member pivotally secured to the other end of each shoe and having pivotal connection with the plate and acting to cause said shoe to move in a circumferential-radial manner to engage the drum and further acting to insure complete disengagement of the shoe from the drum when the centrifugal force acting upon the arms is overcome by said means acting thereon.

4. A clutch mechanism of the character and for the purpose set forth, comprising an annular plate adapted to freely revolve, a drum bearing against said plate and adapted to revolve with a shaft, means for revolving said plate, a pair of weighted arms pivoted at their outer ends at diametrically opposite points to said plate adjacent the periphery thereof and extending inwardly across the face thereof, one on each side of said shaft, means for normally maintaining the inner ends of the arms in close proximity to said shaft, a pair of arcuate friction shoe members, a link connection between one end of each shoe and an adjacent arm, a connecting member pivotally connecting the other end of each shoe to said plate, and means acting upon each connecting member whereby each shoe will be caused to move in a circumferential-radial manner to engage the drum.

5. A clutch mechanism of the character and for the purpose set forth, comprising an annular plate adapted to freely revolve, a drum bearing against said plate and adapted to revolve with a shaft, means for revolving said plate, a pair of weighted arms pivoted at their outer ends at diametrically opposite points to said plate adjacent the periphery thereof and extending inwardly across the face thereof, one on each side of said shaft, means for normally maintaining the inner ends of the arms in close proximity to said shaft, a pair of arcuate friction shoe members, a link connection between one end of each shoe and an adjacent arm, a connecting member pivotally connecting the other end of each shoe to said plate, and means acting upon each connecting member whereby each shoe will be caused to move in a circumferential-radial manner to engage the drum, said means further acting to bring about complete disengagement of the shoe from the drum when the centrifugal force acting upon the arms is overcome by the said means acting thereon.

In testimony whereof, I affix my signature hereto.

NELSON J. PEPIN